UNITED STATES PATENT OFFICE.

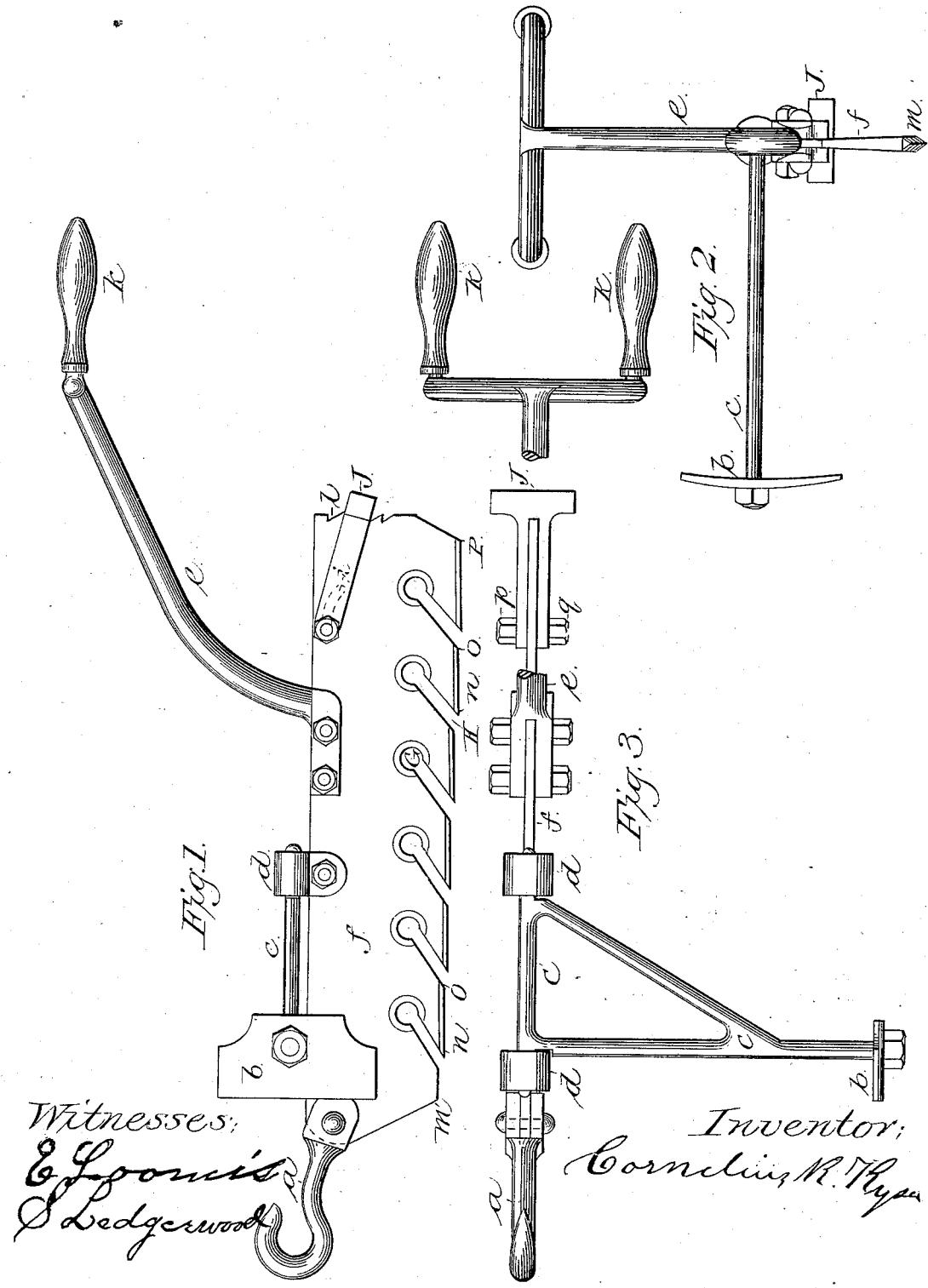

CORNELIUS R. KYSER, OF PARSONS, KANSAS.

ICE-PLOW.

SPECIFICATION forming part of Letters Patent No. 279,653, dated June 19, 1883.

Application filed February 7, 1883. (Model.)

*To all whom it may concern:*

Be it known that I, CORNELIUS R. KYSER, a citizen of the United States, residing at the city of Parsons, in the county of Labette and State of Kansas, have invented a new and useful Ice-Plow, of which the following is a specification.

My invention relates to improvements in ice-plows; and it consists, first, in forming the blade of one solid piece of metal, with the teeth formed integral therewith; second, in so forming the teeth at the base that clogging will be prevented; and, third, in the peculiar formation and construction of the gage for regulating the depth of the cut. I attain these objects by the mechanism illustrated in the accompanying drawings, in which—

Figure 1 represents a side view of the machine; Fig. 2, a front view, and Fig. 3 a top or plan view.

Similar letters refer to similar parts throughout the several views.

F is the cutting-blade of the plow.

b is a vertical blade attached to the outer end of the swing-guide c, and is designed to run in the kerf previously cut to regulate the size of the blocks. The said guide c is hung in loops d d on the top of the blade, so that it may be used on either side at the convenience of the operator.

a is a hook attached to the forward end of the blade, by which the machine may be drawn by either horse or other power when desirable. Ordinarily, however, the plow is propelled from behind by means of the handles k k.

J is a gage to regulate the depth of the cut. It is made in the form of a clevis, and has in its forward part slots i and set-screw p on bolt q, to enable the operator to raise or lower the guide in notches l on the rear end of the blade.

The blade F is made of a plate of cast-steel, thinner at the upper edge than at the bottom, to enable the plow to clear itself of the shavings as it progresses through the ice. The teeth Q are made integral with the blade, and are progressively longer from the forward end to the back.

H is the space between the teeth, and terminates in a round opening, G, at the base. The opening G is countersunk from both sides of the blade to the center, thus forming a sharp edge, which assists in preventing the plow from clogging. The bottom of the teeth are V-shaped in cross-section, and are cut with a slight incline toward the forward end, to enable them to take into the ice with certainty.

The operation of the machine is obvious from its construction. It may ordinarily be worked by one man; but for heavy work horse-power may be used to advantage.

The machine is simple in construction, not liable to get out of repair, and for use on thin ice is a very desirable and economical instrument.

Having thus described my invention, what I claim, and desire to secure by Letters Patent, is—

1. An ice-plow with the blade formed of one plate of metal, with the teeth formed integral therewith, the openings between the teeth terminating at the base in round openings G, countersunk from both sides of the blade to the center, as and for the purpose described.

2. In an ice-plow, the gage J, formed with slots i, and working in notches l at the back end of the blade, as and for the purpose described.

3. In an ice-plow, the gage J, in combination with the blade F, notches l, bolt q, set-screw p, and slots i, as and for the purpose set forth.

CORNELIUS R. KYSER.

Witnesses:
L. P. FOSTER,
E. LOOMIS.